US006796247B1

(12) United States Patent
Iglseder et al.

(10) Patent No.: US 6,796,247 B1
(45) Date of Patent: Sep. 28, 2004

(54) DESK COMPRISING AN INTEGRATED READING DEVICE

(75) Inventors: Heinrich Iglseder, Rodenberg (DE); Martin Fieseler, Essen (DE)

(73) Assignee: Heinrich Iglseder, Rodenberg (DE)

( * ) Notice: Subject to any disclaimer, the term of this patent is extended or adjusted under 35 U.S.C. 154(b) by 0 days.

(21) Appl. No.: 09/937,993

(22) PCT Filed: Mar. 31, 2000

(86) PCT No.: PCT/EP00/02912

§ 371 (c)(1),
(2), (4) Date: Apr. 4, 2002

(87) PCT Pub. No.: WO00/60525

PCT Pub. Date: Oct. 12, 2000

(30) Foreign Application Priority Data

Mar. 31, 1999 (DE) ......................... 199 14 732

(51) Int. Cl.[7] .............................................. A47B 37/00
(52) U.S. Cl. .................................................. 108/50.01
(58) Field of Search .................... 108/50.01, 50.02, 108/147; 248/916–920; 312/223.1, 223.2, 223.3, 195; 361/603, 724, 725, 727

(56) References Cited

U.S. PATENT DOCUMENTS

| 5,461,974 A | * | 10/1995 | Reneau | 108/147 |
| 6,076,473 A | * | 6/2000 | Conte | 108/50.01 |
| 6,220,181 B1 | * | 4/2001 | Horski | 108/50.01 |
| 6,374,752 B1 | * | 4/2002 | Walser | 108/50.01 |
| 6,431,087 B1 | * | 8/2002 | Kotani | 108/50.01 |

FOREIGN PATENT DOCUMENTS

| DE | 4015482 C1 | 7/1991 |
| WO | WO 97/13432 | 4/1997 |

* cited by examiner

Primary Examiner—Jose V. Chen
(74) Attorney, Agent, or Firm—Muramatsu & Associates

(57) ABSTRACT

A table with an interface for the connection of a data processing system includes a reading device integrated in the table which cooperates with a transponder. The reading device contains a circuit component for detecting a modulation of an electromagnetic field caused by the transponder as well as a circuit component for generating a signal corresponding to the modulation and transmitting the signal to the interface of the furniture system.

7 Claims, 4 Drawing Sheets

DESK COMPRISING AN INTEGRATED READING DEVICE

FIELD OF THE INVENTION

The invention relates to a table with an interface for the connection of a data processing system, which is capable of avoiding disruptive cable connection and ensuring secure data transmission.

BACKGROUND OF THE INVENTION

Nowadays many workplaces are equipped with a computer. In such a situation, the monitor, the keyboard and the mouse, amongst other things, are placed on the table, and the connection to the computer is usually made via cable connections. Furthermore, a plug socket is necessary for each electrical device, so that in all there are a large number of cables and plugs present. Work tables with so called cable conduits have already been designed for stowing these cables and plugs.

Interfaces which are integrated in the table surface are also known, the interface being constructed for example as a plug socket for the main power connection or as a connection to a computer. These solutions which are known in the art already make it possible to stow most of the cables and plug sockets which are present. However, there are often devices which require cables which run diagonally over the entire table in an extremely disruptive manner. This is the case in particular with the keyboard and the mouse of a computer.

A computer desk in which the data processing system is integrated in the desk is known from WO 97/13 432. An JR connection is also provided for the communication between the mouse and the data processing system. With this system, however, if objects such as for example books or the like are placed in the transfer connection between the infrared transmitter provided in the mouse and the infrared receiver provided on the desk, then data losses can occur.

A table known from DE-C-40 15 482 relates to a system for contactless authentication of the user of a data terminal of a data processing system. In this case, the user carries with him an identification carrier which is difficult to lose. A distance reader continuously polls the personal user identification on the identification carrier. The distance reader consists principally of a transmitting and receiving coils as well as an electronic assembly. Typically, at least the transmitting and seconding coil is very close to the input keyboard, for example set into the desk support in front of the keyboard. In operation, it is surrounded by a low-frequency magnetic alternating field which reacts to the presence of the identification carrier which is worn for example on the wrist of the user who is for example sitting in front of the monitor and touching the keyboard.

SUMMARY OF THE INVENTION

The object of the invention therefore is to create a table in which disruptive cable connections can be avoided and a secure data or information transfer is ensured.

It is another object of the present invention to provide a table which accommodates means for detecting the modulation of an electromagnetic field in a simple manner.

According to the invention the reading device integrated in the table has means for detecting a modulation of an electromagnetic field caused by the transponder and also means for generating a signal corresponding to the modulation and passing the signal on to the interface of the furniture system.

In a further embodiment of the invention the means for detecting the modulation of the electromagnetic field are formed by at least one antenna, particularly a coil, which is advantageously integrated in the region of the table top.

In a preferred embodiment the table has a table top with abutting edges, and the means for detecting the modulation of the electromagnetic field are disposed in the region of the abutting edges.

Further variants of the invention are explained in greater detail with reference to the following description of some embodiments.

DETAILED DESCRIPTION OF THE INVENTION

Figure 1:
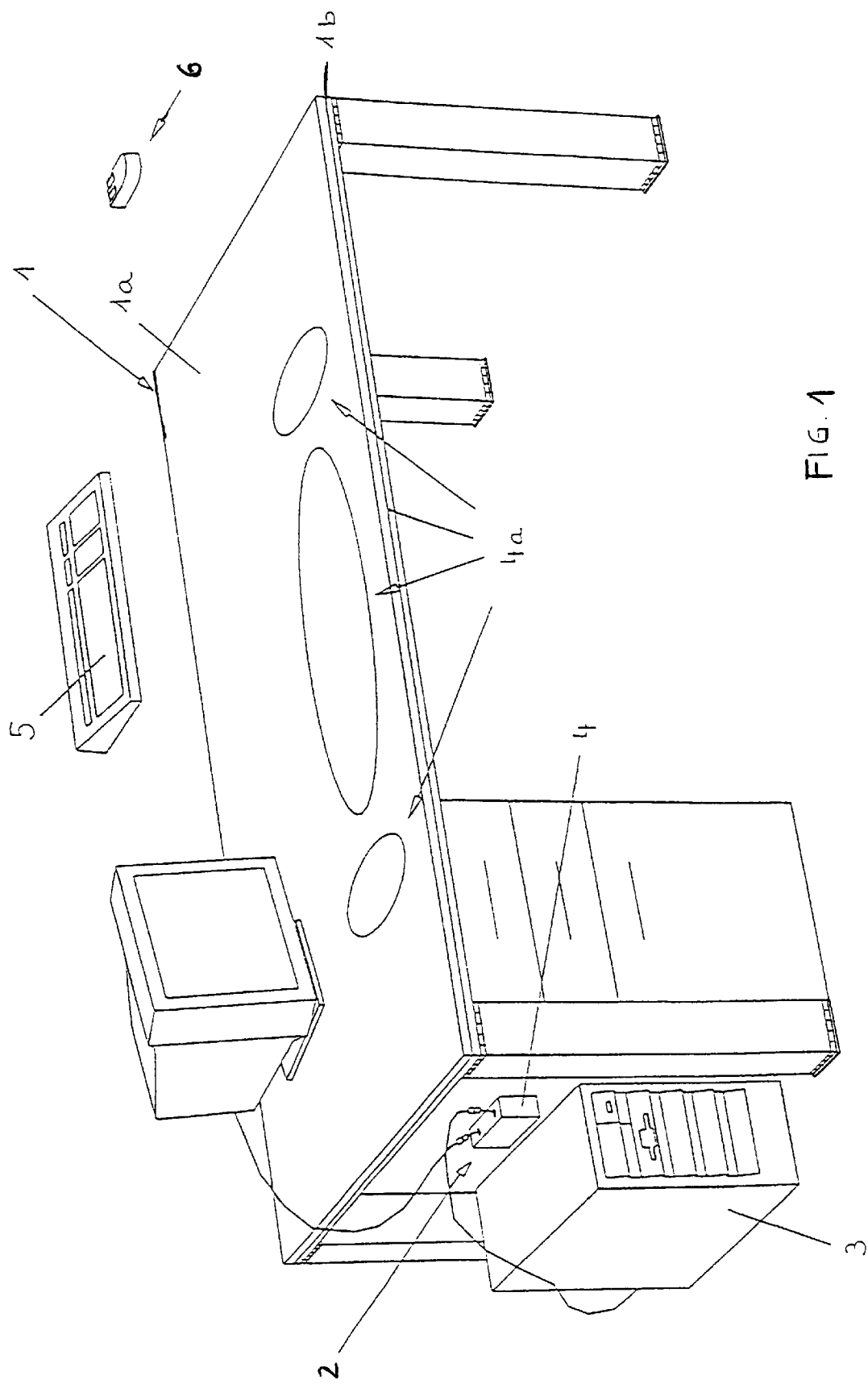
FIG. 1 shows a schematic three-dimensional representation of a table with various devices in the present invention.

The furniture system shown in FIG. 1 is formed by a table 1 which has an interface 2 for the connection of a data processing system, particularly with a computer 3. The table also provides an integrated reading device 4 which detects modulations of an electromagnetic field and passes on a signal corresponding to the modulation to the interface 2.

Figure 2:
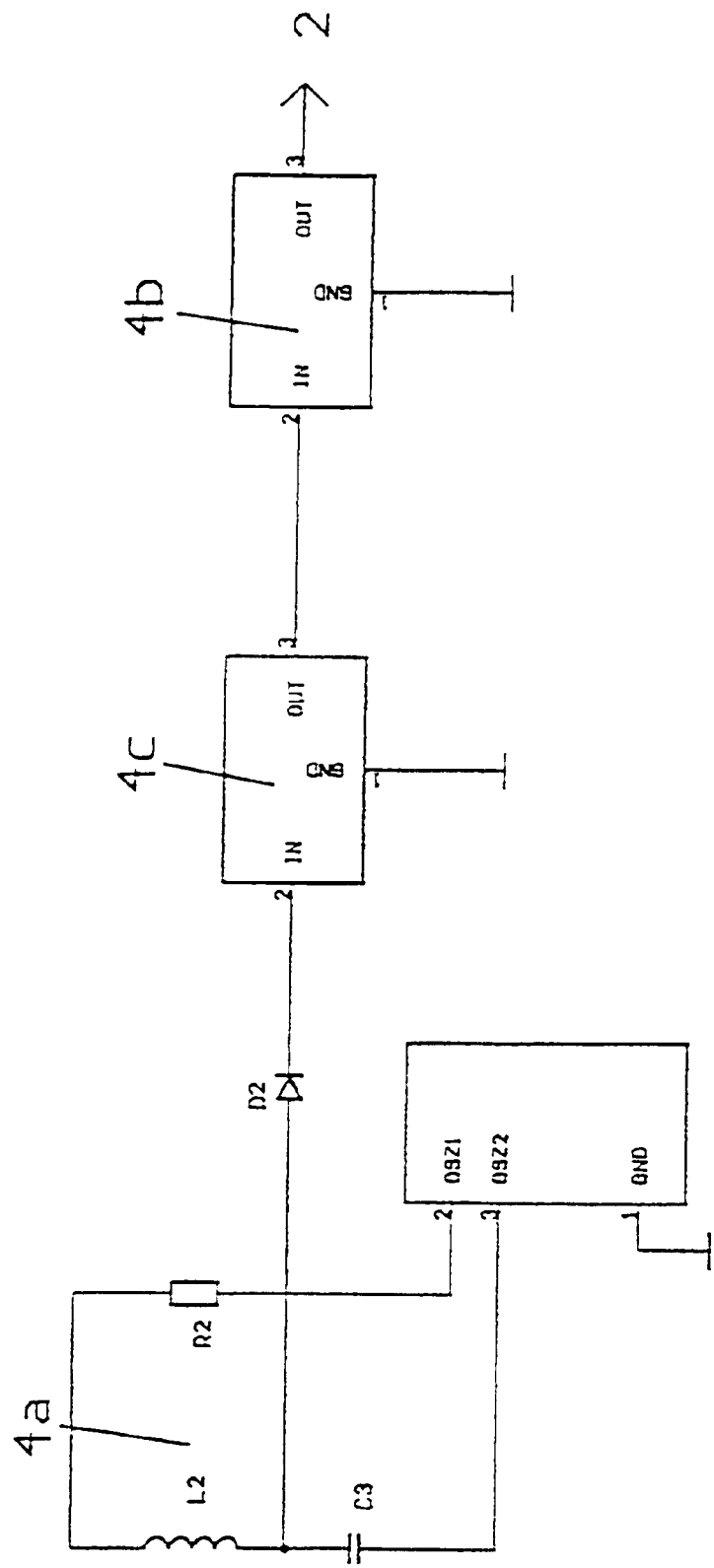
FIG. 2 shows an example of a circuit diagram of a reading device for use with the table of the present invention.

FIG. 2 shows the reading device 4 in greater detail in the form of a block circuit diagram. It consists essentially of means 4a for detecting a modulation of an electromagnetic field caused by a transponder as well as means 4b for generating a signal corresponding to the modulation and passing the signal on to the interface 2. The means 4a are formed for example by an antenna, particularly a coil. The signals which are of interest here are merely passed on by a filter 4c to the means 4b, which are usually constituted by a microprocessor.

In the illustrated embodiment, the electromagnetic field which is necessary between transponder and reading device for the transfer of signals is also generated by the reading device 4, so that the means 4a serve not only as a receiving antenna but also as a transmitting antenna. The electromagnetic field is generated here by the resonant circuit consisting of a coil L2, a capacitor C3, a resistor R2 and an oscillator.

The coil which is necessary for generating the electromagnetic field or for detecting the modulated electromagnetic field is preferably integrated in the region of the table top 1a. In the embodiment according to FIG. 1, the coil is inlaid in the table top 1a. Of course, a plurality of coils could also be provided which co-operate with one or more transponders.

The further components of the reading device, particularly the filter 4c and the microprocessor 4b, can be installed or mounted at any suitable location on the table 1. In the illustrated embodiment according to FIG. 1 only the coils are set into the table top 1a, whilst the rest of the electronics of the reading device 4 and the interface 2 are mounted on the side of the table 1. The reading device 4 advantageously communicates with the data processing unit (computer) 3 via a standard interface (e.g. RS232, Centronics etc., particularly a mouse and/or keyboard interface).

Figure 3:
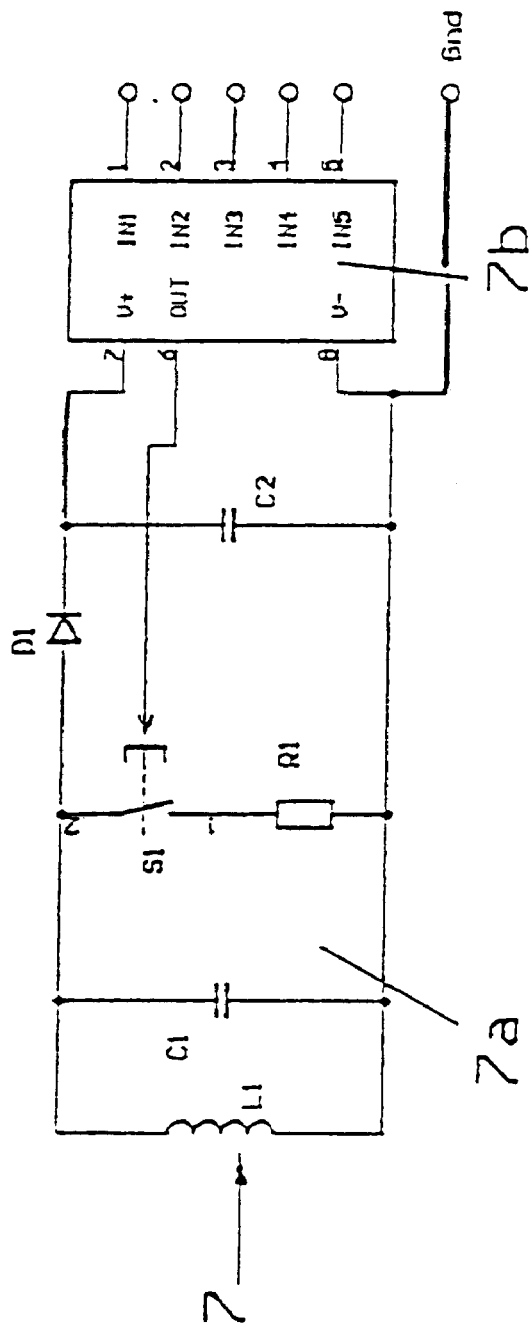
FIG. 3 shows an example of a circuit diagram of a transponder for us th the table of the present invention.

The components which co-operate with the reading device 4 and are usually placed on the table 1 contain a corresponding transponder 7. In the illustrated embodiment, the transponder 7 which co-operates with the reading device 4 is accommodated in an input device such as a keyboard 5 and in a mouse 6. The transponder 7 modulates the electromagnetic field in response to the operation of the input device. The transponder 7 which is illustrated in greater detail in FIG. 3 consists essentially of a resonant circuit 7a and a processor 7b which in particular controls a switch S1 by means of which the amplitude of the electromagnetic field can be modulated. The special feature of the transponder 7 is that it does not require its own current supply, but rather it draws the power necessary for its operation from the electromagnetic field.

The processor 7b is operatively connected to the individual keys of the keyboard 5 or to the sensor of the mouse 6 in order to modulate the electromagnetic field in such a way that the reading device 4 is capable of generating signal which corresponds to the conventional signal transferred via the cable connection between mouse 6 and computer 3 or between keyboard 5 and computer 3.

Such a system enables free communication via the mouse 6 or the keyboard 5 with the computer 3 without a corresponding cable connection being necessary. If the keyboard 5 or the mouse 6 is no longer required, these can be stowed without further work for example in a drawer.

Figure 4:
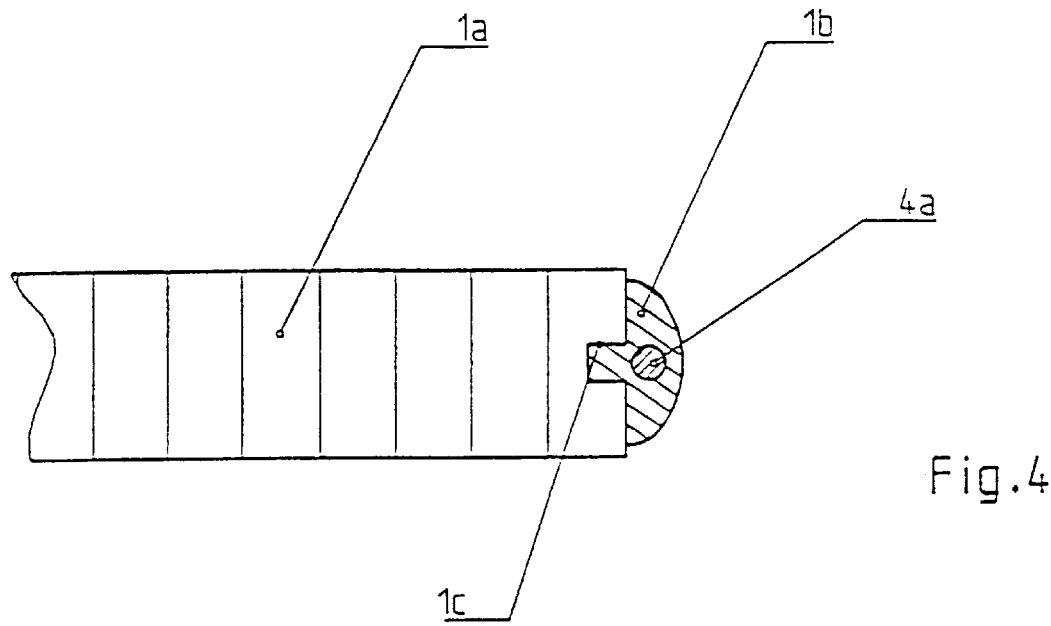
FIG. 4 shows a cross-sectional representation in the region of the edge of the table according to a first embodiment.
Figure 5:
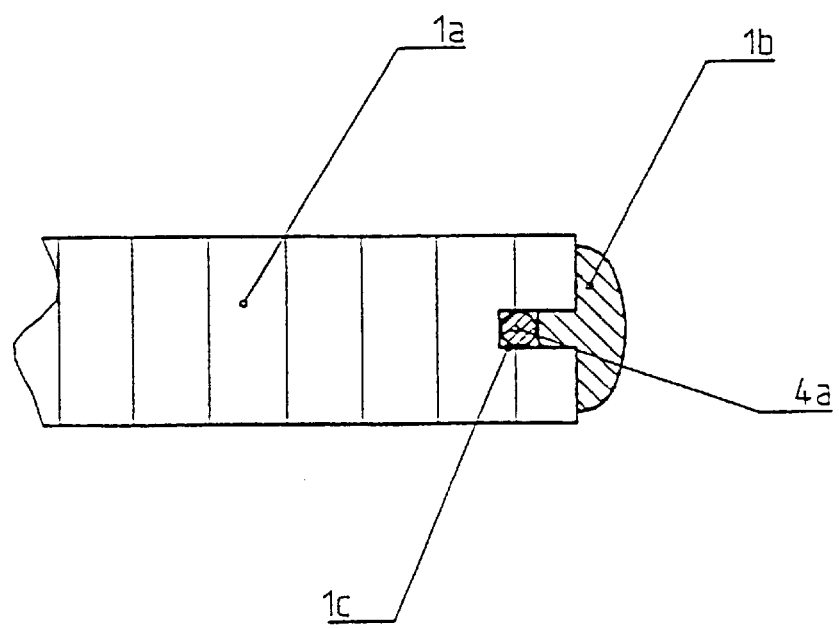
FIG. 5 shows a cross-sectional representation in the region of the edge of the table according to a second embodiment.

FIGS. 4 and 5 show two preferred embodiments of the arrangement of the means 4a in the region of an abutting edge (hereafter, "edge element") 1b of the table top 1a. The element 1b is provided for protection of the edge of the table top 1a against impact damage.

In the first embodiment according to FIG. 4, the means 4a, i.e. in particular the coil, are integrated in the edge element 1b. The edge element 1b can be held for example in the manner of a veneer or, as shown, can be held in a recess 1c provided in the table top 1a.

In the second embodiment according to FIG. 5, the means 4a for detecting the modulation of the electromagnetic field are disposed in the recess 1c in the table top 1a which receives the edge element 1b. The means 4a for detecting the modulation of the electromagnetic field and the edge element 1b can be produced separately in this embodiment, whereby the means 4a are inlaid in the recess 1c before the edge element 1b is attached.

If the means 4a for detecting the modulation of the electromagnetic field are disposed in the region of the abutting edges of the table top, all objects equipped with a corresponding transponder which have been placed at any location on the table can be detected. Due to the size of the coil, in certain circumstances transponders in the vicinity of the table can also be detected.

However, the invention can reasonably be used not only when the transponder is accommodated in a keyboard or a mouse. Thus it is quite conceivable for documents and/or files or the like to be provided with transponders so that by means of corresponding software it can be immediately recognized when a specific file or a specific document is placed on the table or is located in the vicinity of the table. In this way, for example, the location of a specific file can be established immediately by the computer system.

The transponder which is necessary for this purpose is of substantially simpler construction, since it merely has to transmit an adjustable or selectable identifier which is evaluated by the reading device for its identification.

What is claimed is:

1. A table with an interface for connection of a data processing system, comprising:
    a reading device integrated in the table to read signals in a non-contact manner; and
    a transponder provided in an input device of a data processing system to modulate an electromagnetic field in response operations of the input device;
    wherein the reading device is comprised of:
        means for detecting a modulation of the electromagnetic field caused by the transponder; and
        means for generating a signal corresponding to the modulation and transmitting the signal to the interface of the data processing system; and
    wherein the table has a table top on which the input device is placed and an edge element attached to an edge of the table top for protection of the edge against impact damage, wherein the means for detecting the modulation of the electromagnetic field is disposed in the edge element.

2. A table as claimed in claim 1, wherein the reading device also has means for generating the electromagnetic field.

3. A table as claimed in claim 2, wherein the means for detecting the modulation of the electromagnetic field also generates the electromagnetic field.

4. A table as claimed in claim 2, wherein the means for detecting the modulation of the electromagnetic field is formed by at least one antenna.

5. A table as claimed in claim 2, wherein the means for detecting the modulation of the electromagnetic field is formed by a coil.

6. A table as claimed in claim 1, wherein the means for detecting the modulation of the electromagnetic field is disposed in a recess of the edge element attached to the table top.

7. A table as claimed in claim 1, wherein the reading device is only connected to the transponder via the electromagnetic field.

* * * * *